United States Patent [19]
Teles De Menezes Júnior

[11] Patent Number: 5,415,110
[45] Date of Patent: May 16, 1995

[54] REFUSE INCINERATOR

[76] Inventor: António Teles De Menezes Júnior, Rua da Constituicao, no. 1.479 - 3o. Esqo., 4200 Porto, Portugal

[21] Appl. No.: 192,827

[22] Filed: Feb. 7, 1994

[30] Foreign Application Priority Data

Feb. 5, 1993 [ES] Spain .................................. 9300219

[51] Int. Cl.6 .............................................. F23G 5/00
[52] U.S. Cl. .................................. 110/215; 110/108; 110/259; 110/256
[58] Field of Search ................ 110/248, 256, 105, 108, 110/109, 215, 216

[56] References Cited

U.S. PATENT DOCUMENTS

| | | | |
|---|---|---|---|
| 1,523,560 | 1/1925 | Prescott ............................. | 110/256 |
| 4,692,113 | 9/1987 | Takai et al. ........................ | 110/215 |
| 4,744,311 | 5/1988 | Piekos ................................ | 110/108 |
| 4,917,027 | 4/1990 | Albertson et al. ................... | 110/215 |
| 5,081,940 | 1/1992 | Motomura et al. ................. | 110/259 |
| 5,133,267 | 7/1992 | Kent et al. .......................... | 110/215 |

*Primary Examiner*—Henry C. Yuen
*Attorney, Agent, or Firm*—Wenderoth, Lind & Ponack

[57] ABSTRACT

A refuse incinerator includes an installation with two covered hoppers connected at their lower ends by a movable plate to a combustion chamber. A series of plates have been placed in the combustion chamber and have a cadenced movement for moving and oxygenating refuse being incinerated. Cars are located beside the chamber, into which cars the refuse eventually falls. The refuse is later sorted. A boiler is heated by combustion gases, and a series of tanks and containers filter the combustion gases before their release to the outside.

24 Claims, 2 Drawing Sheets

REFUSE INCINERATOR

FIELD OF THE INVENTION

The invention is applicable to industries dedicated to the manufacture of refuse and waste incinerators, and has application within the ecological arena.

BACKGROUND OF THE INVENTION

Currently, there are a multitude of incinerators whose specific mission is to disintegrate refuse elements inside of them, from which the residue must later be extracted by the direct action of a series of operators. The operators must unavoidably wait for the combustion to be completely finished, and for the normalization of the inside temperature of the furnace or combustion chamber which adjusts to the possibilities of action in its interior.

Also, there are different residue or refuse burners which are specifically designed to destroy particular elements, such as tires or similar materials, and even bodies that, as a whole, have combustible elements, but also have incombustible elements which, after combustion of the combustible element, must be removed from a combustion chamber or furnace.

Also, the existence of distinct incinerating elements is known whose purpose is to transform different types of organic matters. Such elements are located at various geographic locations, to which locations the matter to be transformed is conveyed.

However, presently there is no knowledge of an element shaped like a refuse or waste incinerator, which, beyond being a point of transformation and destruction of different bodies, is able to destroy them and, at the same time, automatically separate non-transformable bodies and by its effects product a heating action on a different element which may be used as a source for industry or exploitation and with the possibility of transforming gases generated by combustion or incineration, which therefore will not deteriorate the environment.

An evident solution to the problem existing today in this matter would be to have an incinerator that possesses the conditions recognized as being ideal.

A refuse incinerator according to the invention has the purpose of the nearly total destruction of the refuse inside of it while simultaneously heating a boiler from this incineration. The invention further has the purpose of providing a means to collect, direct, and filter the gases produced in a combustion chamber and recover residue suspended in the gases. Also, the refuse incinerator has the purpose of being able to automatically remove incombustible residue from the combustion chamber allowing for its later classification.

SUMMARY OF THE INVENTION

A refuse incinerator proposed by the invention is by itself an evident solution to the above problem existing today in this matter, since, based on it, the transformation of the different elements to be changed is accomplished automatically. The invention uses independent hoppers for different bodies, and is able to adequately filter the gases from combustion. The invention is equipped, as a result of this process, to serve as a heat source for an additional boiler, from which boiler a totally useful energy can be extracted.

More concretely, the refuse incinerator is based on a construction having a hopper for refuse deposit. The refuse will arrive by different transports that collect and transport refuse, without any need to use additional labor for feeding the hopper, because the refuse collected by the transport is emptied directly into the hopper. The hopper possesses an appropriate opening for allowing normal dumping by dumper or discharge.

The area of the refuse incinerator must be adequately prepared so that the refuse dumping zone is located above the opening of the hopper.

To the side of the hopper which receives the refuse is a second hopper for the deposit of tires and pieces of tires normally used as elements for the movement of automobiles.

The bottom of each of the hoppers, that is, the bottom of the hopper for receiving refuse or the bottom of the hopper for receiving tires, is made up of a plate or zone. The purpose of the plate is to allow an appropriate feed, by movement of the plate, to the combustion chamber located at the lower end of the hoppers. This consequently forces a uniform distribution of the matter incorporated throughout the width of the chamber.

Due to the velocity of the back and forth motion of the plates at the base of the hoppers, the combustion is adequately regulated because the velocity of these plates can be adjusted according to the combustion inside the furnace.

In the upper zone of each of the hoppers, forming an entrance, is an airtight hinged closing cover whose purpose is to impede the release of fumes and any type of gases that could be emitted by the combustion chamber or furnace and which could ignite the contents of the hoppers consequently causing an undesired combustion of the material inside the hoppers, a loss of oxygen, and, the halting of the combustion of the material in the furnace.

The closing covers will only be opened at the time when the refuse or waste, as well as tires, is dumped into the hoppers by transports of these materials.

The insides of the hoppers have a slight incline to stop any large amount of water that enters the hoppers along with the refuse or waste from penetrating to the combustion chamber or furnace and consequently obstructing the combustion of materials in the furnace.

Of course, any residual liquid will be channeled into a conduit adequate for avoiding potential fumes.

In order to permit combustion, the installation provide for an adjustable trap door whose opening will be smaller or larger depending on combustion needs.

To better assist combustion, that is, for an adequate combustion of the organic material to be transformed, used oil or another similar product is employed by using one or several burners located in an appropriate place outside of the combustion chamber but communicating with it.

The lower part of the combustion chamber or furnace, being preferably made of a refractory material, has a slight inclination. The side of a combustion chamber outlet is higher so that the material inside is retained, especially plastic material inside the chamber, until it is completely burned. Due to gravity, the material tends to slide in a direction contrary to the pull of eccentric plates located on the bottom of the chamber. In totally standardized spaces, these plate fulfill the following functions:

sweep, in the first plate, and relift different materials in the combustion furnace or chamber, consequently causing an oxygen intake, which is indispensable for gaining an adequate combustion; and displace different materials of the refuse or waste throughout the chamber so that combustion is processed completely and is not concentrated solely and exclusively in an area where the materials have fallen inside the hoppers.

These eccentric plates are located in different positions so as to allow for the continuous movement of the materials to be burned. At the same time, unburned material, that is, material that is not combustible, is conveyed to an external area of the combustion chamber so that it will fall into cars that will carry it outside of the chamber for classification of the materials.

The velocity of the plates inside the combustion furnace or chamber can be duly adjusted according to the materials to be burned and desired combustion times.

In a final area of the combustion chamber, there is a boiler for the generation of thermoelectric energy. The boiler will be heated according to the heat from the combustion inside the combustion chamber or furnace. Gases from combustion, after being extracted, will also be used for heating the boiler, and will later be extracted and filtered adequately.

The suction of gases will be done by exhausts that facilitate the extraction of differing impurities in a state of suspension in gases, smoke, dust, and fumes that result from the incinerated material within the combustion chamber. Later, these impurities will be conveyed to tanks or containers. The process of suction and conveyance will be repeated as often as necessary so as to guarantee the complete elimination of the impurities in suspension.

The exhausts have been provided with liquid propellers whose function is to scrub and cool the extracted gases. Additionally, these propellers have the function of impeding the exhausts from heating excessively, minimally not allowing impurities to enter the turbines.

The role of the containers, filled with an aqueous solution, is to help the exhausts scrub and cool the gases.

All particles having a configuration more dense than the aqueous solution will be deposited on the bottom of the containers or tanks and will be removed by means of traps to later undergo pertinent recycling.

The containers located in a first position are exactly equal, all of them being closed adequately, and having communication among them by means of a suction line and a second connecting tubing that permits the distribution by decantation of different impurities carried or transported by the gases or smoke, all of the impurities being more dense than the aqueous solution.

The last container, which is connected to the others by a tube, is the only one to have an outlet to the exterior. In this container or tank, floating lampblack is removed by means of a spiral conveyor. This product, that is, the lampblack, after being channeled through a tube and later stored in a tank, can be used for the pigmentation of tires, dyes, and other materials, including brickets in these uses.

This last container is provided with one or more pumps for retrieving the aqueous solution in the first container and, at the same time, feeding the liquid propellers.

The purpose of an air outlet or chimney is to allow for the escape of low-temperature gases from of impurities, with this air outlet or chimney being located in an upper zone of the last container or tank.

It should be noted restrictively that all of the unburned residue, such as ashes, tire rope, indestructible materials, etc., will pass onto cars and be taken outside the combustion chamber or furnace.

These cars work in pairs, one of them receiving the residue from the combustion in the combustion chamber and the other dumping the material transported inside of it. The cars have a movable bottom for dumping so that the bottom can be opened toward screens lying on the side of the incinerator. The screens are totally inclined and equipped with a multitude of holes which increase in size toward a lower zone. The screens vibrate in an effort to separate the different residues in accordance with size. The residue may later be used as raw material for different industries, such as civil construction, glass or siderurgical industries.

BRIEF DESCRIPTION OF THE DRAWINGS

To complement the description being made herein and to facilitate a better understanding of the characteristics of the invention, two pages of drawings are annexed to this description as an integral part thereof, representing the following in an illustrative, but not limiting, nature.

Figure 1:
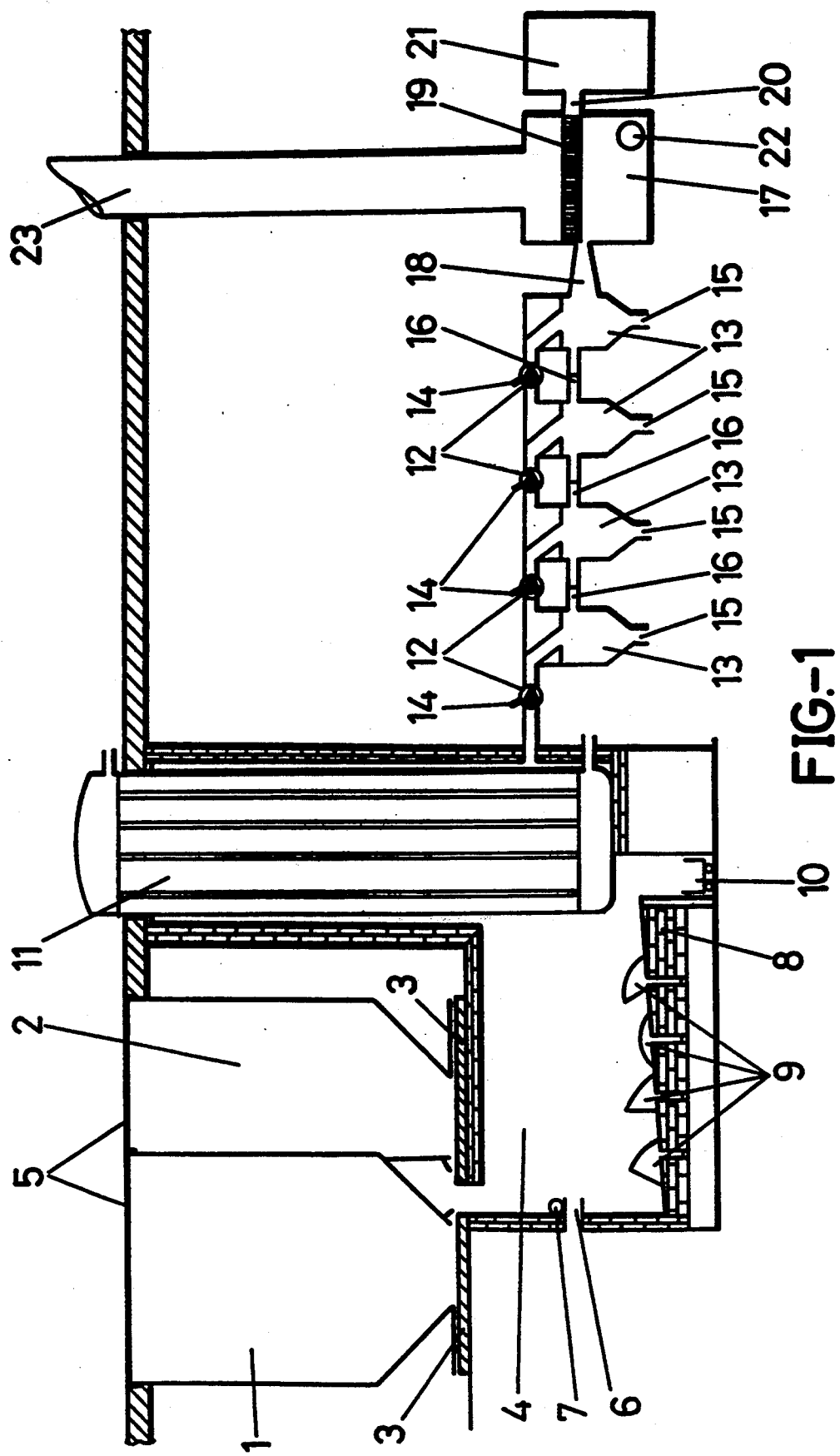
FIG. 1 shows a side elevational and cross-sectional view of a refuse incinerator of the present invention.

DESCRIPTION OF THE PREFERRED
EMBODIMENT OF THE INVENTION

Referring to the figures, it can be seen that a refuse incinerator installation includes a hopper (1) having an upper opening serving as a location for receiving refuse conveyed by different types of transportation. The different types of transportation collect and deposit the refuse into the hopper without any additional use of labor to feed the hopper (1).

A refuse dumping area at the hopper (1) will have to be prepared appropriately and adequately shaped so that the refuse dumping area is above the opening of the hopper (1). A second hopper (2) is placed on a side of the hopper (1) for tires and similar refuse materials.

On the bottom of each of the hoppers (1) and (2) is a plate (3) that moves, when appropriate, to feed a combustion chamber (4) of the incinerator, consequently causing a uniform distribution of the refuse material throughout the entire width of the combustion chamber (4). The velocity of the back and forth movement of the plates (3) which make up the bottom of the hoppers (1) and (2) can be adequately varied and regulated in accordance with combustion feed requirements of the furnace.

Located in an upper area of each of the hoppers (1) and (2) is a lid or cover (5) that swivels, consequently hindering the escape of fumes or gases coming from the combustion chamber, and as a result impeding any ignition of the contents of the hoppers. The covers (5) will only be opened when the refuse materials, e.g. transported by trucks, are dumped into the hoppers (1) and (2).

The bottom of the hoppers (1) and (2) is slightly slanted to prohibit a large quantity of water that may be transported to the hoppers (1) and (2) by the refuse materials being dumped into the hoppers (1) and (2) from causing any deterioration in the combustion of the refuse materials. The residual water or other liquid is adequately channeled to a suitable drain to inhibit possible fumes.

For combustion to occur, the installation provides an adjustable door (6) to permit air to enter the combustion chamber (4). The size of the opening will depend on the combustion needs. To initiate and later assist with the combustion of organic materials to be burned, one or several burners (7) are installed, which employ used oil or other similar products.

A bottom (8) of the combustion chamber (4) is made of refractory material and has an appropriate incline. An unburned materials outlet on the side of the bottom (8) is higher so as to permit the retention of plastic material until it burns completely. Gravity thus causes the material to move in a direction opposite to the pull of a series of movable eccentric plates (9) located at regular intervals at the bottom (8) of the furnace or combustion chamber (4). The plates (9) basically have the function of sweeping and lifting the refuse to inject air or oxygen, thus creating ideal combustion. The eccentric plates (9) move refuse throughout the lower zone of the combustion chamber (4) so that the combustion chamber (4) can process at all points in its interior, the refuse materials placed therein, and so that none of the refuse materials are left in the area at which they are located from the opening of the hoppers.

The eccentric plates (9) are located at different positions in order to permit continuous movement of the material to be burned. The unburned material, that is, material left unburned due to its incombustible nature or characteristics, will be swept by the eccentric plates or elements (9) to a last zone of the combustion chamber (4), from which zone unburned material will fall into cars (10). Of course, the velocity of the movement of the eccentric plates (9) can be adjusted according to the amount of time that combustion lasts.

The last zone of the combustion chamber contains a boiler (11) which generates thermoelectric energy. The boiler (11) fulfills its purpose because the gases originating from the combustion, after they are used for heating the boiler, are extracted by exhausts or extractors (12). The function of these exhausts (12) is to remove all of the impurities, that is, gases, smoke, dust, and fumes, resulting from the combustion generated in the combustion chamber (4) due to the refuse material incinerated therein.

The suspended impurities will later be channeled into tanks or containers (13). The process of extraction and channeling will be repeated as many times as necessary so as to guarantee the elimination of the impurities. The extractors (12) are equipped with liquid propellers (14), whose purpose is to scrub and cool the extracted gases. Additionally, these propellers have the mission of impeding the extractors (12) from being excessively heated, minimally not allowing the impurities to pass into the hoppers.

The function of the tanks or containers (13) having an aqueous solution incorporated therein is to help the extractors scrub and cool the gases. All of the particles denser than the aqueous solution will be deposited on the bottom of the containers by decantation, being removed by means of traps (15) to later be recycled.

The containers or tanks (13) are all exactly the same, and are all closed, but maintain a communication among them by means of a suction line and a connecting tube (16) that allows the distribution, by decantation, of the impurities that are denser than the aqueous solution.

A last container or tank (17), which is connected to the previous tank (13) by a tube (18), is the only one with an outlet to the atmosphere, and a spiral conveyor (19) has been installed in that container (17). Floating or suspended lampblack is removed from the container (17), a product that is later stored in a tank (21) after being channeled thereto by a pipe or tube (20). Later it can be used as pigmentation for tires, dyes, and other uses.

This last container or tank (17) is equipped with one or more pumps (22), whose purpose is not just to retrieve the aqueous solution in the first containers (13) that has passed to the last container (17) by the force of the filtered gases, but also, at the same time, to feed the propellers (14).

The air, now totally free of impurities, and with the temperature lowered, is released through a small-sized chimney (23) located in the last container or tank (17).

Figure 2:
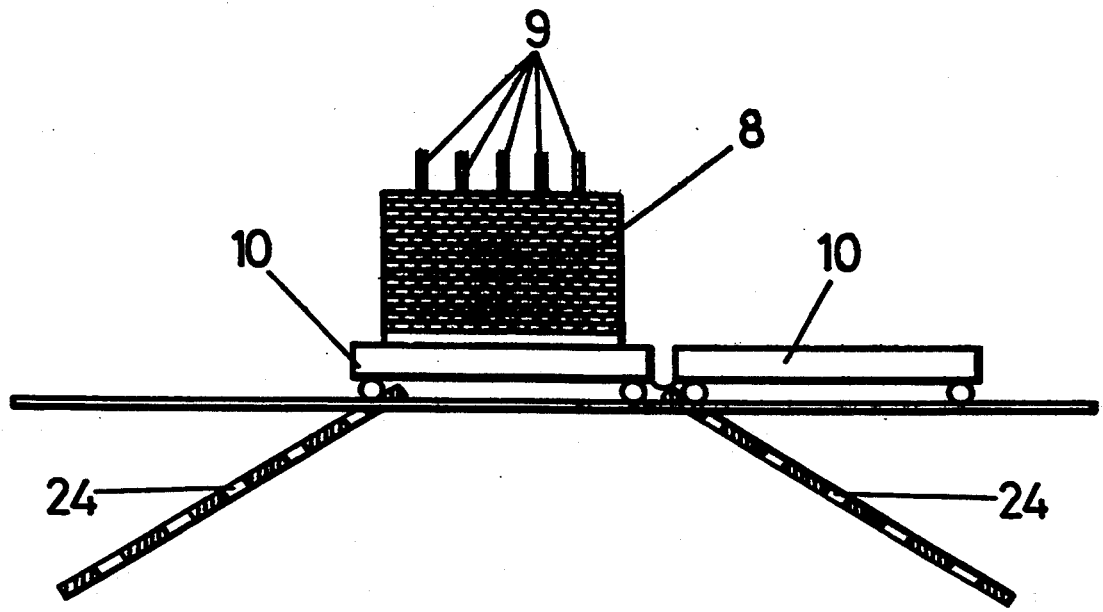
FIG. 2 shows a side elevational view of an area for waste-collecting cars of the invention represented in FIG. 1.

On the other hand, all the residue, that is, ashes, tire rope, etc., will fall into the cars (10), which work in pairs. As can be observed in FIG. 2, one of the cars (10) receives residue from the combustion in the chamber or furnace (4) and the other car dumps through an opening in its bottom, which is totally movable. Thus the car's opening is directed toward one of two screens (24) on each side of the incinerator. The screens are inclined and have a series of perforations that grow in size as they get closer to the lower extreme, and vibrate to allow the separation of the residue according to size, which residue later will be used as raw material for civil construction, glass, and siderurgical industries.

The materials, shape size, and disposition of the elements will be subject to variation as long as doing so does not imply an alteration to the essential nature of the invention. The terms under which this description has been made must always be taken in a broad and non-limiting nature.

I claim:
1. A refuse incinerator, comprising:
   first and second static hoppers, each of said hoppers having an upper opening for receiving a different refuse material therethrough, each of said upper openings being closed by a removable airtight closing cover, and each of said hoppers having an inclined lower surface inclined toward a bottom opening;
   a combustion chamber having a combustion chamber inlet adapted to receive refuse to be incinerated from said bottom openings of said first and second hoppers; and
   a transversely moveable plate between said bottom openings of said first and second hoppers and said combustion chamber inlet that is adapted to push and distribute refuse from said bottom openings of said first and second hoppers to said combustion chamber through said combustion chamber inlet.
2. The refuse incinerator of claim 1, wherein said combustion chamber has a slanted bottom made of refractory material, said slanted bottom having an outlet side forming a combustion chamber outlet of said combustion chamber and an inlet side, said outlet side of said slanted bottom being higher than said inlet side.
3. The refuse incinerator of claim 2, and further comprising a series of eccentric plates movably mounted in said combustion chamber at said slanted bottom for moving and turning refuse on said slanted bottom, said eccentric plates being movable out of phase in relation to each other.

4. The refuse incinerator of claim 1, wherein said combustion chamber has an outlet for combustion gases, and wherein said refuse incinerator further comprises a boiler in communication with said outlet for recovering heat from the combustion gases.

5. The incinerator of claim 1, and further comprising a combustion chamber outlet and two vibrating perforated screens located at said combustion chamber outlet, each of said screens being inclined toward a different side of said combustion chamber outlet.

6. The incinerator of claim 5, wherein said screens have perforations therein that are larger the closer said perforations are to lower extremes of said screens.

7. The incinerator of claim 1, and further comprising a plurality of extractors connected by conduits with said combustion chamber and containers in communication with said extractors, said containers having a filtering liquid therein, for extracting combustion gases and filtering the combustion gases.

8. The refuse incinerator of claim 7, wherein said containers are arranged with said extractors such that the combustion gases pass through said filtering liquid in said containers.

9. The refuse incinerator of claim 7, wherein said containers are interconnected by conduits such that said filtering liquid can be circulated between said containers.

10. The refuse incinerator of claim 7, wherein said extractors have filtering liquid propellers associated therewith for washing and cooling said extractors with filtering liquid.

11. The refuse incinerator of claim 10, wherein a final one of said containers has a spiral conveyor therein for collecting and conveying lampblack, a pump connected with said filtering liquid propellers for circulating the filtering liquid, and a cooled and impurity free gas outlet, said outlet being connected with a chimney leading to the exterior of said refuse incinerator.

12. A refuse incinerator comprising:
a first hopper having an upper opening for receiving refuse material therethrough and a bottom opening;
a second hopper having an upper opening for receiving refuse material therethrough located adjacent to said first hopper and a bottom opening;
a removable airtight closing cover on said upper openings of said first and second hoppers;
a combustion chamber located below said bottom openings of said first and second hoppers, said combustion chamber comprising a chamber inlet for receiving refuse material therethrough from said first and second hoppers, a chamber bottom for receiving refuse material thereon, and a chamber outlet for distributing combustion gases and uncombusted material therefrom, an air inlet to said combustion chamber and at least one burner therein; and
a transversely movable distributing plate located between said bottom openings of said first and second hoppers and said chamber inlet of said combustion chamber for pushing and distributing refuse material from said bottom openings of said first and second hoppers to said combustion chamber through said chamber inlet.

13. The refuse incinerator of claim 12, wherein said chamber bottom has an inclined surface slanted upwardly from an inlet side of said chamber bottom located below said chamber inlet toward an outlet side of said combustion chamber located at said chamber outlet.

14. The refuse incinerator of claim 13, wherein said chamber bottom comprises a plurality of eccentric plates movably mounted therein for moving refuse material in said combustion chamber up said inclined surface and ensuring complete combustion of the refuse material.

15. The refuse incinerator of claim 14, wherein said plurality of eccentric plates are spaced along said inclined surface of said chamber bottom for out of phase movement of said eccentric plates in relation to each other.

16. The refuse incinerator of claim 12, and further comprising a boiler located at said chamber outlet for recovering heat from combustion gases.

17. The refuse incinerator of claim 12, and further comprising a pair of vibrating screens located at said chamber outlet for receiving uncombusted material from said combustion chamber, wherein said vibrating screens are each perforated and inclined for sorting the uncombusted material.

18. The refuse incinerator of claim 17, wherein perforations in said screens are larger the closer said perforations are to lower extreme ends of said vibrating screens.

19. The refuse incinerator of claim 17, wherein said chamber bottom has an inclined surface slanted upwardly from an inlet side of said chamber bottom located below said chamber inlet toward an outlet side of said chamber bottom located at said chamber outlet, and said vibrating screens are located below said outlet side of said chamber bottom.

20. The refuse incinerator of claim 19, and further comprising carts for receiving uncombusted material from said outlet side of said chamber bottom and distributing the uncombusted material to said vibrating screens.

21. The refuse incinerator of claim 12, and further comprising a plurality of extractors fluidly connected with said chamber outlet of said combustion chamber for extracting combustion gases from said combustion chamber and a plurality of containers connected with said extractors, said containers containing a filtering liquid therein for filtering the combustion gases.

22. The refuse incinerator of claim 21, and further comprising a plurality of liquid propellers connected with said extractors for washing and cooling said extractors with filtering liquid.

23. The refuse incinerator of claim 22, and further comprising a pump in a final one of said containers for circulating filtering liquid from the final one of said containers to said liquid propellers and a gas outlet in the final one of said containers for releasing cooled and impurity free gas from the final one of said containers to the environment, wherein said plurality of containers are interconnected to feed combustion gases and filtering liquid toward the final one of said containers.

24. The refuse incinerator of claim 23, and further comprising a spiral conveyor in the final one of said containers connected to a collection tank for collecting conveying lampblack from the final one of said containers to said collection tank.

* * * * *